United States Patent
Ko (10) Patent No.: US 12,459,483 B2
(45) Date of Patent: Nov. 4, 2025

(54) OIL LEAK DETECTING METHOD OF BRAKE SYSTEM AND DETECTING SYSTEM THEREOF

(71) Applicant: HL MANDO CORPORATION, Gyeonggi-do (KR)

(72) Inventor: Yeonben Ko, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 315 days.

(21) Appl. No.: 18/121,645

(22) Filed: Mar. 15, 2023

(65) Prior Publication Data

US 2023/0294658 A1 Sep. 21, 2023

(30) Foreign Application Priority Data

Mar. 15, 2022 (KR) .................. 10-2022-0032286

(51) Int. Cl.
*B60T 17/22* (2006.01)
*B60T 13/68* (2006.01)

(52) U.S. Cl.
CPC .......... *B60T 17/221* (2013.01); *B60T 13/686* (2013.01); *B60T 17/225* (2013.01); *B60T 2270/403* (2013.01)

(58) Field of Classification Search
CPC ..... B60T 13/686; B60T 17/221; B60T 17/225
See application file for complete search history.

(56) References Cited

U.S. PATENT DOCUMENTS

2018/0297574 A1* 10/2018 Zimmermann ....... B60T 8/4081
2024/0239326 A1* 7/2024 Kim ..................... B60T 17/221

FOREIGN PATENT DOCUMENTS

| JP | 2020-082848 | 6/2020 |
| KR | 10-2016-0036320 | 4/2016 |
| KR | 10-2019-0037599 | 4/2019 |
| KR | 10-2020-0006772 | 1/2020 |
| KR | 10-2227220 | 3/2021 |

OTHER PUBLICATIONS

Office Action dated Aug. 10, 2023 for Korean Patent Application No. 10-2022-0032286 and its English machine translation by Google Translate.

* cited by examiner

*Primary Examiner* — Eric S. McCall
(74) *Attorney, Agent, or Firm* — WOMBLE BOND DICKINSON (US) LLP (57) ABSTRACT

Disclosed is an oil leak detecting method of a brake system and an oil leak detecting system thereof. The method includes: closing a first hydraulic circuit and monitoring an amount of a leak of brake oil in a second hydraulic circuit; closing the second hydraulic circuit and monitoring an amount of a leak of brake oil in the first hydraulic circuit; and determining where brake oil leaks from among the first hydraulic circuit and the second hydraulic circuit. The first hydraulic circuit controls a flow of hydraulic pressure transmitted to two wheel cylinders. The second hydraulic circuit controls a flow of hydraulic pressure transmitted to other two wheel cylinders.

15 Claims, 4 Drawing Sheets

OIL LEAK DETECTING METHOD OF BRAKE SYSTEM AND DETECTING SYSTEM THEREOF

CROSS-REFERENCE TO RELATED APPLICATION

This application claims the benefit of Korean Patent Application No. 10-2022-0032286, filed on Mar. 15, 2022 in the Korean Intellectual Property Office, the disclosure of which is incorporated herein by reference.

BACKGROUND

1. Field

The present disclosure relates to an oil leak detecting method of a brake system and an oil leak detecting system thereof, and more particularly, to an oil leak detecting method of a brake system capable of identifying a location of the leak when brake oil leaks in the brake system, and an oil leak detecting system thereof.

2. Description of the Related Art

As a brake system applied to a vehicle, an electronic brake system is used, which ensures a braking force by a hydraulic pressure. When a user presses a brake pedal, the electronic brake system does not generate hydraulic pressure by itself, but causes a motor to operate in accordance with an electronic signal.

Such an electronic brake system has the advantage that development of a brake pedal force, an operating range of a pedal, and the like may be adjusted to the preference of a driver. For this reason, the maintenance of brake oil for a braking operation is very important, and it is highly likely associated with a high risk of accident in the case of oil leak.

Conventionally, in order to detect a leak of brake oil, a pressure value measured using a pressure sensor is compared with a pressure value calculated based on the position of a piston so as to detect the leak. However, when the pressure value calculated based on the position of the piston is used in this manner, it is difficult to detect oil leak when minute oil leak occurs, and accordingly, all the brake oil may leak out.

SUMMARY

The present disclosure provides an oil leak detecting method of a brake system capable of detecting a minute leak of brake oil, and an oil leak detecting system thereof.

In one aspect of the present disclosure, there are provided an oil leak detecting method of a brake system and an oil leak detecting system thereof. The method includes: closing a first hydraulic circuit and monitoring an amount of a leak of brake oil in a second hydraulic circuit; closing the second hydraulic circuit and monitoring an amount of a leak of brake oil in the first hydraulic circuit; and determining where brake oil leaks from among the first hydraulic circuit and the second hydraulic circuit. The first hydraulic circuit controls a flow of hydraulic pressure transmitted to two wheel cylinders. The second hydraulic circuit controls a flow of hydraulic pressure transmitted to other two wheel cylinders.

The method may further comprise checking a level of brake oil; and the monitoring of the amount of leak of brake oil in the second hydraulic circuit may comprise monitoring the amount of leak of brake oil in the second hydraulic circuit based on a level of the brake oil being lower than a preset value.

The method may further include: monitoring the second hydraulic circuit to check whether or not the amount of leak of break oil in the second hydraulic circuit is greater than a preset value; and the monitoring of the amount of leak of brake oil in the first hydraulic circuit may comprise monitoring the amount of leak of brake oil in the first hydraulic circuit based on an amount of leak of brake oil in the second hydraulic circuit being not greater than the preset value.

The determining where brake oil leaks from among the first hydraulic circuit and the second hydraulic circuit, may comprise determining that a leak has occurred in the second hydraulic circuit based on an amount of leak of brake oil in the second hydraulic circuit being greater than the preset value.

The method may further include monitoring the first hydraulic circuit to check whether the amount of leak of brake oil in the first hydraulic circuit is greater than a preset value.

The determining where brake oil leaks from among the first hydraulic circuit and the second hydraulic circuit, may comprise determining that a leak has occurred in the first hydraulic circuit based on an amount of leak of brake oil in the first hydraulic circuit being greater than the preset value.

The method may further include comparing a leak flow rate of brake oil from the first hydraulic circuit with a leak flow rate of brake oil from the second hydraulic circuit.

The determining where brake oil leaks from among the first hydraulic circuit and the second hydraulic circuit, may comprise determining that leak has occurred in the first hydraulic circuit based on a leak flow rate of brake oil from the first hydraulic circuit being greater than a value obtained by adding a reference value to the leak flow rate of brake oil from the second hydraulic circuit.

The method may further include comparing a leak flow rate of brake oil from the first hydraulic circuit with a leak flow rate of brake oil from the second hydraulic circuit.

The determining where brake oil leaks from among the first hydraulic circuit and the second hydraulic circuit, may comprise determining that a leak has occurred in the second hydraulic circuit based on a leak flow rate of brake oil from the second hydraulic circuit being greater than a value obtained by adding a reference value to the leak flow rate of brake oil flowing out of the first hydraulic circuit.

The determining where brake oil leaks from among the first hydraulic circuit and the second hydraulic circuit, may comprise determining that no leak has occurred in the first hydraulic circuit and the second hydraulic circuit based on a leak flow rate of brake oil from the second fluid circuit being not greater than the value obtained by adding the reference value to the leak flow rate of the braking oil from the first fluid circuit.

In another aspect of the present disclosure, an oil leak detecting system includes: a first hydraulic circuit configured to control a flow of hydraulic pressure transmitted to two wheel cylinders; a second hydraulic circuit configure to control a flow of hydraulic pressure transmitted to other two wheel cylinders; first and second inlet valves for opening and closing the first hydraulic circuit; and third and fourth inlet valves for opening and closing the second hydraulic circuit; and a controller configured to control the first, second, third and fourth inlet valves. The controller may close one of the first hydraulic circuit and the second hydraulic circuit, and monitor an amount of leak of break oil from the other one which is not closed so as to determine a circuit in which brake oil leaks.

The oil leak detecting system further comprises: a first leak detector configured to detect an amount of leak of brake oil in the first hydraulic circuit; and a second leak detector configured to detect an amount of leak of brake oil in the second hydraulic circuit.

The control unit may close the first hydraulic circuit, monitor the second hydraulic circuit, and determine that a leak has occurred in the second hydraulic circuit based on an amount of leak of break oil from the second hydraulic pressure circuit being greater than a preset value.

The controller may close the second hydraulic circuit, monitor the first hydraulic circuit, and determine that brake oil leaks in the first hydraulic circuit based on an amount of leak of break oil from the first hydraulic pressure circuit being greater than a preset value.

The controller may determine that hydraulic pressure has occurred in the first hydraulic circuit based on a leak flow rate of brake oil from the second hydraulic circuit being greater than a value obtained by adding a reference value to the leak flow rate of the braking oil from the second hydraulic circuit.

The controller may determine that brake oil leaks in the second hydraulic circuit based on a leak flow rate of brake oil from the first hydraulic circuit being greater than a value obtained by adding a reference value to the leak flow rate of brake oil from the second hydraulic circuit.

The controller may close one of the first hydraulic circuit and the second hydraulic circuit, monitor the amount of leak of the other one hydraulic circuit which is not closed, and determine that no leak has occurred in the first and second hydraulic circuits based on an amount of leak being not greater than the preset value.

The control unit may determine that no leak has occurred in the first hydraulic circuit and the second hydraulic circuit based on a leak flow rate of brake oil from the first hydraulic circuit being not greater than a value obtained by adding a reference value to the leak flow rate of the braking oil from the second oil hydraulic circuit.

The controller may determine that no leak has occurred in the first hydraulic circuit and the second hydraulic circuit based on a leak flow rate of brake oil from the second hydraulic circuit being not greater than a value obtained by adding a reference value to a leak flow rate of brake oil from the first fluid hydraulic circuit.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Figure 1:
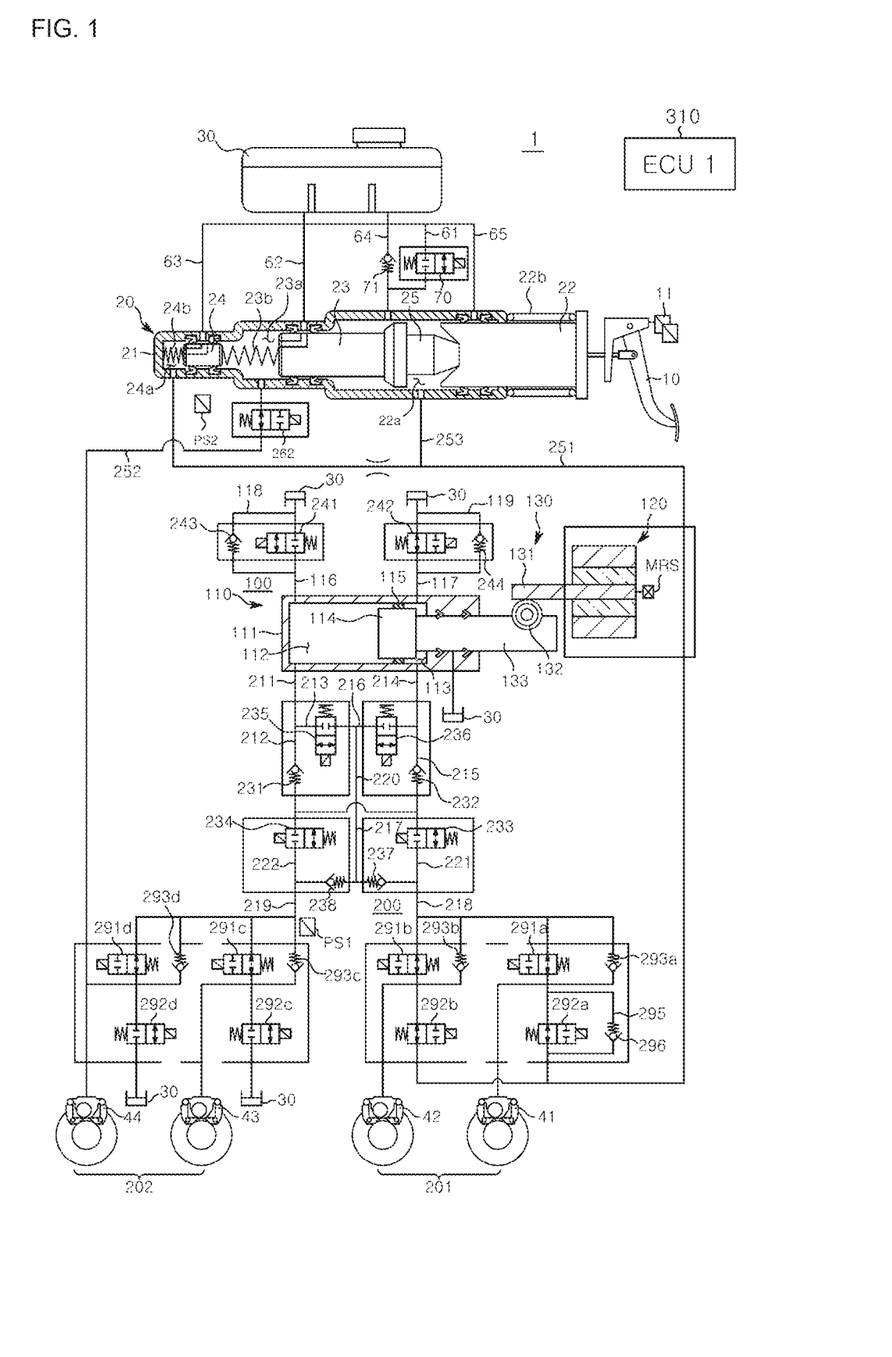
FIG. 1 is a hydraulic circuit diagram showing a brake system according to an embodiment of the present disclosure.

Referring to FIG. 1, a hydraulic circuit of a brake system according to an embodiment of the present disclosure is first described.

An electronic brake system (1) according to the present embodiment includes: a reservoir (30) for storing a fluid therein; wheel cylinders 41, 42, 43, and 44 for respectively braking wheels RR, RL, FR, and FL to which a hydraulic pressure of the fluid is transmitted; a hydraulic-pressure-supplying device 100 for generating a hydraulic pressure of a fluid through a mechanical operation by receiving a signal indicative of a driver's intention to brake from a pedal displacement sensor 11 for sensing a displacement of a brake pedal 10; and an electronic control unit 310 for controlling the hydraulic-pressure-supplying device and various valves based on hydraulic pressure information and pedal displacement information.

The electronic control unit is provided to control the operation of a first hydraulic unit and a second hydraulic unit. More specifically, the electronic control unit may control a first hydraulic unit included in a first hydraulic circuit, which is the flow of hydraulic pressure transmitted to the first and second wheel cylinders 41 and 42 among the four wheel cylinders, and may control a second hydraulic unit included in a second hydraulic circuit, which is the flow of hydraulic pressure transmitted to the third and fourth wheel cylinders 43 and 44.

The electronic brake system 1 according to the present embodiment may further include a simulator providing a reaction force corresponding to a stepping force of the brake pedal 10 to the driver, and a master cylinder 20 pressurizing and discharging a fluid such as brake oil accommodated inside. At this point, the electronic control unit 310 may control the operation of a check valve 71 provided on a simulation flow path 64 to be described later, and the operation of a simulator valve F for controlling the bidirectional flow of a fluid delivered through a simulation flow path 64 from a reservoir bypass flow path 61. Further, the electronic control unit may control the operation of a cut valve 262 provided in a second backup flow path 252 to be described later.

The first and second hydraulic units include a plurality of flow paths and valves to control the hydraulic pressure transmitted from a master cylinder 20 or the hydraulic-pressure-supply device 100 to the wheel cylinders 41, 42, 43 and 44 in accordance with a signal output from the electronic control unit.

More specifically, the first hydraulic unit includes: a fourth hydraulic flow path communicating with a second pressure chamber 113; fifth and six hydraulic flow paths 215 and 216 branched off from the fourth hydraulic pressure flow path 214; an eighth hydraulic flow path 218 branched off from a seventh hydraulic flow path 217; and an eleventh hydraulic fluid path 221 extending from the fifth hydraulic flow path 215. Further, the first hydraulic unit includes: a second valve 23 provided in the fifth hydraulic flow path 215 to control a fluid flow; a third valve 233 provided in the eleventh hydraulic flow paths 221 to control a fluid flow; a sixth valve 236 provided in the sixth hydraulic pressure flow path 236 to control a fluid flow; and a seventh valve 237 provided in the eighth hydraulic pressure flow path 218 to control a fluid flow.

The second hydraulic unit includes: a first hydraulic flow path 211 communicating with a first hydraulic chamber 112; second and third hydraulic flow paths 212 and 213 branched from the first hydraulic flow path 211; a ninth flow path 219 branched from the seventh flow path 217 into which the second and fifth fluid flow paths 212 and 215 are merged; and a second fluid flow path 222 connected to a tenth fluid flow path 220, into which the third and sixth fluid flow paths 213 and 216 are merged, and extending from the second fluid flow path 212. The second hydraulic unit further includes: a first valve 231 provided in the second hydraulic flow path 212 to control a fluid flow; a fourth valve 234 provided in a twelfth hydraulic flow path 222 to control a fluid flow; a fifth valve 235 provided in the third hydraulic flow path 213 to control a fluid flow; and an eighth valve 238 provided in the ninth hydraulic flow path 219 to control a fluid flow.

Meanwhile, the simulator may be provided inside the master cylinder 20. That is, the master cylinder 20 includes the simulation chamber 22a and the master chambers 23a and 24a, so when a driver applies a pressing force to a brake pedal 10 for a braking operation, the master cylinder 20 may provide a reaction force to the driver, thereby providing stable pedal feeling, and pressurize and discharge a fluid accommodated inside. Specifically, the master cylinder 20 includes: a cylinder block 21 forming a chamber therein; a simulation chamber 22a formed in an inlet side of the cylinder block 21 to which the brake pedal 10 is connected; a simulation piston 22 provided in the simulation chamber 22a and connected to the brake pedal 10 so as to be displaceable depending on an operation of the brake pedal 10; a first master chamber 23a; a first master piston 23 provided in the first master chamber 23a and displaceable by a hydraulic fluid generated in the simulation piston 22a according to displacement of the simulation piston 22 or displacement of the simulation piston 22; or hydraulic pressure generated in the simulation chamber 22a according to displacement of the simulation piston 22; a second master chamber 24a; a second master piston24 provided in the second master chamber 24a and displaceable by hydraulic pressure generated in the first master chamber 23a according to displacement of the first master piston 23 or displacement of the first master piston 23; an elastic member 25 provided between the simulation piston 22 and the first master piston 23 to provide a pedal feeling through elastic restoring force generated during compression; a simulator spring 22b elastically supporting the simulation piston 22; a first piston spring 23b elastically supporting the first master piston 23; and a second piston spring 24b elastically supporting the second master piston 24.

The simulation piston 22, the first master piston 23, and the second master piston 24 may be disposed in the simulation chamber 22a, the first and second master chambers 23a, and the second master chamber 24a, respectively, so as to pressurize a fluid accommodated in each chamber or generate a negative pressure according to forward and backward movements. A simulation piston 22 connected to an input rod of the brake pedal 10 may be reciprocally accommodated in the simulation chamber 22a. In a state where the simulation valve70 is open, the simulation chamber 22a communicates with the reservoir 30 through the simulation flow path 64, and thus, in this case, although the simulation piston 22 moves forward, the fluid contained in the simulation chamber 22a is not pressurized. However, when the simulator valve 70 is operated to close, the simulation chamber 22a and the reservoir 30 are shut off, so the simulation chamber 22a is sealed, and thus, the fluid contained in the simulation chamber 22a may be pressurized according to forward movement of the simulation piston 22. This will be described later in more detail.

The first master chamber 23a may be formed on the inner side of the simulation chamber 22a 21 (on the left side with reference to FIG. 1) on the cylinder block 21, and the master piston 23a may be reciprocally accommodated in the second master chamber The first master piston 23 may be provided and accommodated in the first master chamber 23a, and may pressurize a fluid contained in a first master chambers 23a by moving forward or may form a negative pressure in the inside of the first main chamber 23b by moving backward. Specifically, when the first master piston 23 moves forward, a volume of the first main chamber 23a decreases, so the fluid present inside the first master chamber 23a may be pressurized to form a hydraulic pressure. On the other hand, when the first master piston 23 moves backward, the volume of the first master chamber 23a increases, so the fluid present in the inside of first master chamber 23a may be depressurized and, at the same time, a negative pressure may be formed in the first master chamber 23a. The second master chamber 24a a may be formed inside the first master chamber 23a (on the left side with reference to FIG. 1) on the cylinder block 21, and the second master piston 24 may be reciprocally accommodated in the second main chamber 24a. The second master piston 24 may be provided and accommodated in the second master chamber 24a, and may pressurize a fluid contained in the second master chamber 24a by moving forward or may form a negative pressure in the second main chamber 24a by moving backward. Specifically, when the second master piston 24 moves forward, the fluid present in the second main chamber 24a decreases, so the fluid present in the second master chamber 24a may be pressurized to form a hydraulic pressure. On the other hand, when the second master piston 24 moves backward, the fluid present in the second main chamber 24a increases, so the fluid present in the second master chamber 24a may be pressurized and at the same time a negative pressure may be formed in the second master chamber 24a.

The simulator spring 22b is provided to elastically support the simulation piston 22. As the brake pedal 10 is operated, the simulation piston 22 is displaced. At this point, the simulator spring 22b is compressed. Afterwards, when the pressing force of the brake pedal 10 is released, the simulation piston 22 may return to its original position as the simulator spring 22b expands by an elastic force. The first piston spring 23b and the second piston spring 24b are provided so as to elastically support the first master piston 23 and the second master piston 24, respectively. When the first piston spring 23b and the second piston spring 26b are displaced according to an operation, such as a braking operation, the first piston spring 23b and the second piston spring 24b are respectively compressed. Then, when the operation such as the braking operation is released, the first master piston 23 and the second master piston 24 may return to their original positions, respectively, as the first piston spring 23b and the second piston spring 24b expands by an elastic force. The elastic member 25 is disposed between the simulation piston 22 and the first master piston 23, and is provided to provide the driver with a pedal feeling of the brake pedal 10 by its elastic restoring force. The elastic member 25 may be of a material such as a compressible and expandable rubber. When displacement occurs in the simulation piston 10 due to an operation of the brake pedal 10, the elastic member 25 may be compressed and the driver may be able to have a stable and familiar pedal feeling due to an elastic restoring force of the compressed elastic member 25.

The reservoir flow path may include: a simulation flow path 64 connecting the simulation chamber 22a and the reservoir 30; a first reservoir flow path connecting the first master chamber 23a and the reservoir 30; a second reservoir flow path 63 connecting the second master chamber 24a and the reservoir 30; and an auxiliary reservoir flow path 65 auxiliary connecting the simulation chamber 22a and the reservoir 30. The simulation flow path 64 may be provided with a simulator check valve 71 that allows only the flow of a fluid from the reservoir 30 to the simulation chamber 22a. Meanwhile, the reservoir flow path may further include a reservoir bypass flow path 61 connected in parallel with the check valve 71 on the simulation flow path 64. To this end, the reservoir bypass flow path 61 may be provided with a simulator valve 70 which controls the flow of the fluid, delivered through the simulation flow path 64, in both directions. The simulator valve 70 may be a normally closed type solenoid valve, which is normally in a closed state and operates to be opened upon a signal received from the electronic control unit 310. In the drawings, several reservoirs 30 are shown, and the reservoirs 30 are indicated by the same reference numeral. These reservoirs 30 may be provided as the same component or as different components.

As for a pedal simulation operation by the master cylinder 20, when the driver operates the brake pedal 10 in a normal operation, a cut valve 262 provided in a backup flow path 252 and first and second outlet valves 292a and 292b are closed by an operation of the electronic control unit 310, and the simulator valve 70 on the reservoir bypass flow path 61 is opened. As the operation of the brake pedal 10 progresses, the simulation piston 22 moves forward, but the first and second backup flow paths 251 and 252 are closed by the closing of the cut valve 262 and the first and second outlet valves 292a and 292b. Accordingly, there is no displacement of the first master piston 23 and second master piston 24. Therefore, the displacement of the simulation piston 22 may compress the elastic member 25, and an elastic restoring force due to the compression of the outer member may be provided to the driver as a pedal feeling. At this point, the fluid contained in the simulation chamber 22a is delivered to the reservoir 30 through the simulation flow path 64. Afterwards, when the driver releases the pressing force of the brake pedal 10, the simulator spring 22b and the elastic member 22 expand by an elastic force, so the simulation piston 22 returns to its original position, and the simulation chamber 22a may be filled with the fluid that is supplied through the simulation flow path 64 and the reservoir bypass flow path 61.

As described above, the inside of the simulation chamber is always filled with the fluid, so if the friction between the simulation piston and the cylinder block is minimized during a pedal simulation operation, it is possible to improve the durability of the master cylinder 20 and prevent the introduction of foreign matters from the outside.

The hydraulic pressure supply device 100 is provided so as to generate a hydraulic pressure through a mechanical operation by transmitting a signal indicating a driver's intention of braking from a pedal displacement sensor 11, which senses a displacement of a brake pedal 10. The hydraulic pressure supply device 100 may include: a hydraulic pressure providing unit 110 for providing hydraulic pressure that is to be transmitted to wheel cylinders; a motor 120 for generating a rotational force in accordance with a signal from the pedal displacement sensor 11; and a power converter 130 for converting a rotational motion of the motor 120 into a linear motion and transmitting the linear motion to the hydraulic pressure providing unit 110. In addition, the hydraulic pressure providing unit 130 includes: a cylinder block 111 provided so as to accommodate a fluid; a hydraulic piston 114 accommodated in the cylinder block 111; a sealing member 115 provided between the hydraulic piston 114 and the cylinder block 111 to seal a pressure chamber 112 and 113; and a drive shaft 133 for transmitting power output from the power converter 130 to the hydraulic piston 114.

The pressure chamber 112 and 113 may include: a first pressure chamber 112 disposed in front of the hydraulic piston 113 (that is, on the left side of the hydraulic piston 114 in FIG. 1), and a second pressure chamber 113 disposed behind the hydraulic piston 114 (that is, on the right side of the hydraulic piston 114 in FIG. 1). That is, the first pressure chamber 112 is defined by the cylinder block 111 and a front surface of the hydraulic piston 114 and provided with a volume that varies depending on movement of the first hydraulic piston, and the second pressure chamber 113 is defined by the cylinder block 111 and a rear surface of the second hydraulic piston 114 and provided with a volume that varies depending on movement of the second hydraulic piston 114. The first pressure chamber 112 is connected to the first hydraulic flow path 211 through a first communication hole formed in the cylinder block 111, and the second pressure chamber 113 is connected to a fourth hydraulic flow path 214 through a second communication hole formed in the cylinder block 111. The sealing member includes: a piston sealing member 115 provided between the hydraulic piston 114 and the cylinder block 111 to seal space between the first pressure chamber 112 and the second pressure chamber 113; and a drive shaft sealing member provided between the drive shaft 133 and the cylinders block 111 to seal an opening between the second pressure chamber 113 and the cylinder block 111. The hydraulic pressure or negative pressure of the first pressure chamber 112 and the second pressure chamber 113 generated by forward or backward movement of the hydraulic piston 114 may be sealed by the piston sealing member 115 and the drive shaft sealing member and may be transmitted without leak to the first hydraulic flow path 211 and the fourth hydraulic flow path 214 The first pressure chamber 112 and the second pressure chamber 113 may be connected to the reservoir 30 by first and second dump flow paths 116 and 117 and by first and second bypass flow path 118 and 119, respectively. In doing so, it is possible to be supplied with a fluid from the reservoir 30 and accommodate the fluid or to deliver the fluid of the first pressure chamber 112 or the second pressure chamber 113 to the reservoir 30. To this end, the first dump flow path 116 may be connected with the reservoir 30 by communicating with the first pressure chamber 112 through a third communication hole formed in the cylinder block 111, and the second pressure chamber 113 may be connected to the reservoir 30 by communicating with the second pressure chamber 113 through a fourth communication hole formed in the cylinder block 111. Further, the first bypass flow path 118 may be branched from the first dump flow path 116 and then rejoined later, and the second bypass flow path119 may be branched from the second dump flow path 117 and rejoined later.

The first dump flow path 116 and the second dump flow path 117 may be provided with a first dump valve 241 and a second dump valve 242, respectively, for controlling the flow of a fluid. Referring back to FIG. 1, the first dump valve 241 may be provided as a two-way solenoid valve that controls the flow of a fluid between the first pressure chamber 112 and the reservoir 30, and the second dump valve 242 may be disposed as a bidirectional solenoid valve that controls the flow of a fluid between the second pressure chamber 113 and the reservoirs 30. The first dump valve 241 may be provided as a normally closed type solenoid valve which is normally in a closed state and, upon a signal received from the electronic control unit 310, operates to close, and the second dump valve 242 may be provided as a normal open type solenoid valve which is normally in an open state and operates to be closed upon a signal received from the electronic control unit 310. The first bypass flow path 118 may be connected in parallel to the first dump valve 241 in the first dump flow path 116, and the first dump check valve 243 may be provided in the first bypass flow path 118 to control the flow of a fluid between the first pressure chamber 112 and the reservoir 30. In other words, the first bypass flow path 118 may bypass and connect the front and rear sides of the first dump valve 241 on the first dump flow path 116, and the first dump check valve 243 may be provided to allow only the flow of a fluid from the reservoir 30 to the first pressure chamber 112 and block the flow of fluid in the opposite direction. Further, the second bypass flow path119 may be connected in parallel to the second dump valve 242 on the second dumping flow path117, and a second dump check valve 244 for controlling the flow of a fluid between the second pressure chamber 113 and the reservoir 30 may be provided in the first bypass flow path 119. In other words, the second bypass flow path119 may bypass and connect the front and rear sides of the second dump valve 242 on the second dumping flow path117, and the second dump check valve 244 may be provided to allow only the flow of a fluid from the reservoir 30 to the second pressure chamber 113 and block the flow of fluid in the opposite direction.

The motor 120 is provided to generate a driving force by a signal output from the electronic control unit 310. The motor 120 may include a stator and a rotor. In doing so, the motor 120 may be able to rotate in a forward or reverse direction, thereby providing power for generating displacement of the hydraulic piston 114. The rotational angular velocity and rotational angle of the motor 120 may be precisely controlled by a motor control sensor (MPS). Since the motor 120 is a well-known technology, a detailed description thereof will be omitted. The power converter 130 is provided to convert a torque of the motor 120 into a linear motion. As an example, the power converter 130 may be provided in a structure including a worm shaft 131, a worm wheel 132, and a drive shaft 133. The worm shaft 131 may be integrally formed with a rotational shaft of the motor 120, and a worm may be formed in an outer circumferential surface thereof to engage with the worm wheel 132, thereby rotating the worm wheel 132. The worm wheel 132 may be connected to the drive shaft 133 so as to engage with the worm wheel 133 so that the drive shaft 133 can be linearly moved. In addition, since the drive shaft 133 is connected to the hydraulic piston 114, the hydraulic piston 114 may move in a sliding manner in the cylinder block 111.

The above operations may be described again as follows. When a pedal displacement sensor 11 senses displacement of the brake pedal 10, the sensed signal is transmitted to electronic control unit 310 and the electronic control unit 310 drives the motor 120 to rotate the worm shaft 131 in one direction. A rotational force of the worm shaft 131 may be transmitted to the drive shaft 133 via the worm wheel 132, and the hydraulic piston 114 connected to the drive shaft 133 may move forward in the cylinder block 111, thereby generating a hydraulic pressure in the first pressure chamber 112.

On the other hand, when a pressing force of the brake pedal 10 is released, the electronic control unit 310 drives the motor 120 to rotate the worm shaft 131 in the opposite direction. Therefore, the worm wheel 132 may also be rotated in the opposite direction, and the hydraulic piston 114 connected to the drive shaft 133 may move backward, thereby generating a negative pressure in the first pressure chamber 112. The generation of the hydraulic pressure and the negative pressure in the second pressure chamber 113 may be realized by performing the above operations in the opposite directions. That is, when a displacement of the brake pedal 10 is sensed by the pedal displacement sensor 11, the sensed signal is transmitted to the electronic control unit 310 and the electronic control unit 310 drives the motor 120 to rotate the warm shaft 131 in the opposite direction. A rotational force of the worm shaft 131 is transmitted to the drive shaft 133 via the worm wheel 132, and the hydraulic piston 114 connected to the drive shaft 133 may move backward in the cylinder block 11, thereby generating a hydraulic pressure in the second pressure chamber 113. On the other hand, when a pressing force of the brake pedal 10 is released, the electronic control unit 310 controls the motor 120 in one direction to rotate the worm shaft 131 in one direction. Therefore, the worm wheel 132 may also rotate reversely, and the hydraulic piston 114 connected to the drive shaft 133 may move forward in the cylinder block 111, thereby generating a negative pressure in the second chamber 113.

As described above, as for the hydraulic pressure supply deice 100, a hydraulic pressure or a negative pressure may be generated in the first pressure chamber 112 and the second pressure chamber 113 depending on a direction of rotation of the worm shaft 131 upon driving of the motor 120. In this case, whether to perform a braking operation by transmitting the hydraulic pressure or release the braking operation by using the negative pressure may be determined by controlling valves. This will be described later in more detail. Meanwhile, it should be noted that the power converter 130 according to the present embodiment is not limited to one specific structure as long as it can convert a rotational movement of the motor 120 to a linear movement of the hydraulic piston 114, and even when the power converter 130 is configured in any of various structures and any of various methods should be understood as the same.

The first hydraulic flow path 211 may be provided so as to communicate with the first pressure chamber 112, and may be branched into the second hydraulic flow path 212 and the third hydraulic flow path 213. Further, the fourth hydraulic flow path 214 may be provided so as to communicate with the second pressure chamber 113, and may be branched into the fifth hydraulic flow path 215 and the sixth hydraulic flow path 216.

The first valve 231 for controlling the flow of fluid may be provided at the second hydraulic flow path. The first valve 231 may be provided as a check valve that allows only the flow of fluid in a direction discharged from the first pressure chamber 112 and blocks the flow of fluid in the opposite direction. That is, while allowing the hydraulic pressure generated in the first pressure chamber 112 to be transmitted to the first hydraulic circuit 201 and the second hydraulic circuit 202, the first valve 231 may prevent the flow of fluid in the opposite direction from leaking to the first pressure chamber 112 via the second hydraulic flow path 212.

The fifth hydraulic flow path 215 may be provided with a second valve 232 for controlling the flow of fluid. The second valve 232 may be provided as a check valve that allows only the flow of fluid in a direction discharged from the second pressure chamber 113 and blocks the flow of fluid in an opposite direction. That is, while allowing the hydraulic pressure generated in the second pressure chamber 113 to be delivered to the first hydraulic circuit 201 and the second hydraulic circuit 202, the second valve 232 may prevent the flow of fluid in the opposite direction from leaking to the second pressure chamber 113 via the fifth hydraulic flow path 215.

The third hydraulic flow path 213 may be provided with the fifth valve 235 for controlling the flow of fluid. The fifth valve 235 may be provided as a two-way control valve that controls the flow of fluid delivered along the third hydraulic flow path 213. The fifth valve 235 may be provided as a normally closed type solenoid valve, which is normally closed and operates to be opened upon a signal received from the electronic control unit 310.

The sixth hydraulic flow path 216 may be provided with the sixth valve 236 for controlling the flow of fluid. The sixth valve 236 may be provided as a two-way control valve that controls the flow of the fluid to be delivered along the sixth hydraulic path 216. The sixth valve 236 may be a normally closed type solenoid valve that is normally in a closed state and operates to be opened upon a signal received from the electronic control unit 310.

The tenth hydraulic flow path 220 may be provided as the third hydraulic flow path 213 and the sixth hydraulic flow path 216 are merged with each other, and the eleventh hydraulic flow path 221 and the twelfth hydraulic flow path 222 may be provided as extending from the fifth hydraulic flow path 215 and the second hydraulic fluid path 212, respectively.

The third and fourth valves 233 and 234 for controlling the flow of fluid may be provided in the eleventh and twelfth hydraulic flow paths 221 and 222, respectively. The third valve 233 may be provided as a two-way control valve that controls the flow of fluid that is delivered from the eleventh hydraulic flow path 221 along the first hydraulic circuit 201. The third valve 233 may be a normally closed type solenoid valve that is normally in a closed state and operates to be opened upon a signal received from the electronic control unit 310. Similarly, the fourth valve 234 may be provided as a two-way control valve for controlling the flow of the fluid to be delivered from the twelfth hydraulic flow path 222 along the second hydraulic circuit 202. The fourth valve 234 may be a normally closed type solenoid valve that is normally in a closed state and operates to be opened upon a signal received from the electronic control unit 310.

In this case, when a technical problem occurs in the electronic control unit 310, the third valve 233 may remain in a closed state so that the flow of fluid delivered along the first and second wheel cylinders 41 and 42 is blocked. Accordingly, the fluid discharged from the first pressure chamber 112 may be delivered only to the third and fourth wheel cylinders 43 and 44 along the fourth valve 234 opened by a signal from the electronic control unit 310. Similarly, when a technical problem occurs with the electronic control unit 310, the fourth valve 234 may remain in a closed state so that the flow of fluid delivered along the third and fourth wheel cylinders 43 and 44 is blocked. Accordingly, the fluid discharged from the first pressure chamber 112 may be delivered only to the first and second wheel cylinders 41 and 42 along the third valve 233 opened by the electronic control unit 310.

The seventh hydraulic flow path 217 may be provided as the third hydraulic flow path 213 and the sixth hydraulic oil path 216 are merged, and the eighth hydraulic flow path 218 and the ninth hydraulic flow path 219 may be provided as branched from the seventh hydraulic flow path 217 toward the first to fourth wheel cylinders 41 to 44.

The eighth hydraulic flow path 218 and the ninth hydraulic flow path 219 may be respectively provided with the seventh valve 237 and the eighth valve 238 for controlling the flow of the fluid. The seventh valve 237 may be provided as a check valve that allows only the flow of fluid from the first hydraulic circuit 201 to the tenth hydraulic flow path 220 and blocks the flow of fluid in the opposite direction. That is, the seventh valve 237 may prevent a hydraulic pressure from being released from the first pressure chamber 112 or the second pressure chamber 113 to the first hydraulic circuit 201, while allowing a hydraulic pressure to be delivered from the first hydraulic circuit 201 to the tenth hydraulic flow path 220. Similarly, the eighth valve 238 may be provided as a check valve that allows only the flow of fluid from the second hydraulic circuit 202 to the tenth hydraulic flow path 220 and blocks the flow of fluid in the opposite direction. As a result, the eighth valve 238 may prevent a hydraulic pressure from being released to the first pressure chamber 112 or the second pressure chamber 113 to the second hydraulic circuit 202, while allowing a hydraulic pressure to be delivered from the second hydraulic pressure circuit 202 toward the tenth oil pressure path 220.

According to the arrangement of the hydraulic flow paths and the valves, a hydraulic pressure formed in the first pressure chamber 112 in response to forward movement of the hydraulic piston 114 may be transferred to the first hydraulic circuit 201 sequentially through the first hydraulic flow path 211, the second hydraulic flow path 212, the seventh flow path 217, and the eleventh hydraulic flow path 221, and may be transferred to the second hydraulic circuit 202 sequentially through the first hydraulic flow path 211, the second hydraulic flow path 212, the seventh flow path 217, and the twelfth hydraulic flow path 222. In addition, a hydraulic pressure formed in the second pressure chamber 113 in response to backward movement of the hydraulic piston 114 may be transferred to the first hydraulic circuit 201 sequentially through the fourth hydraulic flow path 214, the fifth hydraulic flow path 215, the seventh hydraulic flow path 217, and the eleventh hydraulic flow path 221, and may be transferred to the second hydraulic circuit 202 sequentially through the fourth hydraulic flow path 214, the fifth hydraulic flow path 215, the seventh hydraulic flow path 217, and the twelfth hydraulic flow path 222.

On the other hand, a negative pressure formed in the first pressure chamber 112 in response to backward movement of the hydraulic piston 114 may recover the hydraulic pressure or fluid of the first and second hydraulic circuits 201 and 202. Specifically, when the fifth valve 235 is opened, the hydraulic pressure in the first hydraulic circuit 201 may be transferred to the first pressure chamber 112 sequentially through the eighth hydraulic flow path 218, the tenth hydraulic flow path 220, the third hydraulic flow path 213, and the first hydraulic flow path 211, and the hydraulic pressure in the second hydraulic circuit 202 may also be transferred to the first pressure chamber 112 sequentially through the ninth hydraulic flow path 219, the tenth hydraulic flow path 220, the third hydraulic flow path 213, and the first hydraulic flow path 211. In addition, a negative pressure formed in the second pressure chamber 113 in response to forward movement of the hydraulic piston 114 may recover the hydraulic pressure or fluid in the first hydraulic circuit 201 and the second hydraulic circuit 202 in the second pressure chamber 113. Specifically, when the sixth valve 236 is opened, the hydraulic pressure in the first hydraulic circuit 201 may be transferred to the second pressure chamber 113 sequentially through the eighth hydraulic flow path 218, the tenth hydraulic flow path 220, the sixth hydraulic flow path 216, and the fourth hydraulic flow path 214, and the hydraulic pressure in the second hydraulic circuit 202 may be transferred to the first pressure chamber 112 sequentially through the twelfth hydraulic flow path 222, the ninth hydraulic flow path 219, the sixth hydraulic flow path 217m and the fourth hydraulic flow path 214.

In this case, a first hydraulic unit of the first hydraulic circuit 201 may control hydraulic pressure of first and second wheel cylinders, which are two wheel cylinders out of the four wheels RR, RL, FR, and FL, and a second hydraulic circuit of the second hydraulic unit 202 may control hydraulic pressure of the other third and fourth wheel cylinders 43 and 44.

The first hydraulic circuit 201 may be provided with hydraulic pressure through the eleventh hydraulic flow path 221, and the eleventh flow path 221 may be provided as branching into two flow paths connected to the first wheel cylinder 41 and the second wheel cylinder 42. In addition, the first hydraulic circuit 201 may discharge the hydraulic pressure through the eighth hydraulic flow path 218, and may be provided as the two flow paths are joined to each other from the first wheel cylinder 41 and the second wheel cylinder 42. The second hydraulic circuit may be provided with hydraulic pressure from the hydraulic supply device 100 through the twelfth hydraulic flow path 222, and the twelfth hydraulic pressure flow path 222 may be provided as branching into two flow paths connected to the third wheel cylinder 43 and the fourth wheel cylinder 44. Then, the second hydraulic circuit 202 may discharge hydraulic pressure through the ninth hydraulic flow path 219, and may be provided as two flow paths are joined from the third wheel cylinder 43 and the fourth wheel cylinder 44 toward the ninth hydraulic flow path 219.

The first and second hydraulic units included in the first and the second hydraulic circuits 201 and 202 may include first to fourth inlet valves 291 (291a, 291b, 291c, 291d) to control the flow and the hydraulic pressure of fluid delivered to the first to the fourth wheel cylinders 41, 42, 43, and 44. The first to fourth inlet valves 291 may be each disposed on the upstream side of the first to fourth wheel cylinders 41, 42, 43, and 44, and may be each provided as a normal open type solenoid valve, which is normally in an opened state and operates in accordance with the electronic control unit 310. More specifically, the first and second inlet valves 291a and 291b operate to be closed in response to receiving a signal from the electronic control unit 310, and the third and fourth inlet valve 291c and 291d operate to be closed in response to receiving a signal from the electronic control unit 310.

The first and second hydraulic units included in the first and the second hydraulic circuits 201 and 202 may include first to fourth check valves 293a, 293b, 293c, and 293d which are connected in parallel to the first to the fourth inlet valves 291a, 291b, 291c, and 291d. The check valves 293a, 293b, 293c, and 293d may be provided at the bypass flow paths connecting the front and rear o the first to fourth inlet valves 291a, 291b, 291c, and 291d on the first and second hydraulic circuits 201 and 202, and may allow only the flow of fluid from the respective wheel cylinders to the hydraulic pressure providing unit 110 and block the flow of fluid from the hydraulic fluid providing unit 110 to the wheel cylinders. By the first to fourth check valves 293a, 293b, 293c, and 293d, it is possible to quickly release the hydraulic pressures of the fluid applied to the respective wheel cylinders, and even in a case where the first to the fourth inlet valves 291a, 291b, 291c, and 291d do not operate normally, the hydraulic pressure of fluid applied on the wheel cylinders may be smoothly returned to the hydraulic pressure providing unit 110.

The first hydraulic unit may be provided with first and second outlet valves 292a and 292b which are connected to the first backup flow path 251 for improving performance when braking is released. The first and second outlet valves 292a and 292b are connected to the first and the second wheel cylinders 4a and 42, respectively, to control the flow of fluid discharged from the wheel cylinders. That is, the first and second outlet valves 292a and 292b may sense braking pressure of the first wheel cylinder 41 and the second wheel cylinder 42, so, in a case where pressure reduction is required, such as an ABS dump mode, the first and second outlet valves 292a and 292b may be selectively opened to control pressure reduction of the wheel cylinders. A fluid discharged to the first backup flow path 251 through the first and second outlet valves 292a and 292b may be delivered to the reservoir 30 through the simulation chamber 22a and the simulation flow path 22b. The first and second outlet valves 292a may be provided with a normal open type solenoid valve that is normally in an opened state and operates to be closed upon a signal from the electronic control unit 310 to close the first backup flow path 251. Meanwhile, reference numerals 295 and 296 denote a bypass flow path 295 and a check valve 296 connected in parallel to the first outlet valve 292a for smooth connection between the first hydraulic circuit 201 and the first backup flow path 251.

The second hydraulic unit may be provided with third and fourth outlet valves 292c and 292d which are directly connected to the reservoir 30 for improving the performance of the third wheel cylinder 43 and the fourth wheel cylinder 44 when braking is released. The third and fourth outlet valves 292c and 292d are connected to the third and the fourth wheel cylinders 43 and 44, respectively, to control the flow of fluid from the wheel cylinders 43 and 44. That is, the third and fourth outlet valves 292c and 292d may sense braking pressure of the third wheel cylinders 44 and 44, so, in case where pressure reduction is required, such as an ABS dump mode, the third and fourth outlet valves 292c and 292d may be selectively opened to control pressure reduction of the wheel cylinders. The third and fourth outlet valves 292c and 292d may be each provided as a normal closed type solenoid valve, which is normally in a closed state and operates to be opened upon a signal received from the electronic control unit 310.

The electronic brake system 1 according to the present embodiment may include first and second backup flow paths 251 and 252 capable of implementing a braking operation by directly supplying a fluid discharged from the master cylinder 20 to the wheel cylinders when normal operation is impossible due to a device failure or the like. A mode in which the hydraulic pressure of the master cylinder 20 is directly transmitted to a wheel cylinder is referred to as a fallback mode.

The first backup flow path 251 may be provided so as to connect the first master chamber 23a of the master cylinder 20 to the first hydraulic circuit 201, and the second backup flow paths 252 may be provided so as to connect the second master chamber 24a of the master cylinder 20 to the second hydraulic circuit 202 In addition, an auxiliary backup flow path 253 may auxiliarily connect the simulation chamber 22a and the first hydraulic circuit 201 by communicating the simulation chamber 22a and the first backup passage 251.

Specifically, the first backup flow path 251 may be connected to at least one of the rear ends of the first outlet valve 292a and the second outlet valve 292b on the first hydraulic circuit 201, and the second backup flow path 252 may be connected to at least one of the rear ends of the third inlet valve 291c and the fourth inlet valve 291d on the second hydraulic circuit 202. Although the first backup flow path251 is shown as branched and connected to the rear ends of the first outlet valve 292a and the second outlet valve 292b and the second backup flow path 252 is shown as connected to the rear end of the fourth inlet valve 291d, the present disclosure is not limited thereto. The first backup flow path251 may be branched and connected to at least one of the rear ends of the first outlet valve 292a and the second outlet valve 282b, and the second backup flow path 252 may be connected to at least one of the rear ends of the third inlet valve 291c and the fourth inlet valve 291d.

As described above, the first and second outlet valves 292a and 292b may be each provided as a normal open type solenoid valve, which is normally in an open state and operates to be closed upon a signal from the electronic control unit 310t close the first backup flow path 251. Further, the second backup flow path 252 may be provided with the cut valve 262 for controlling the flow of fluid in both directions. The cut valve 262 may be provided as a normal open type solenoid valve, which is normally in an opened state and operates in response to receiving a signal from the electronic control unit 310.

Thus, when the first and second outlet valves 292a and 292b and the cut valve 262 are closed, the fluid of the master cylinder 20 may be prevented from being directly transferred to the wheel cylinders 41, 42, 43, and 44 and at the same time the hydraulic pressure provided by the hydraulic pressure supply device 100 may be supplied to the wheel cylinders via the first hydraulic circuit 202 and the second hydraulic circuit 522, and when the first and second outlet valves 292a and 292b and the cut valve 262 are opened, the pressurized fluid in the master cylinder 20 may be supplied directly to the wheel cylinders 42, 43, and 44 through the first and second backup flow paths 251 and 252 to implement a braking operation.

The electronic brake system 1 according to the present embodiment may include a first pressure sensor PS1 for sensing hydraulic pressure of at least one of the first hydraulic circuit 201 and the second hydraulic circuit 202, and a second pressure sensor PS2 for sensing hydraulic pressure of the master cylinder 20. In the drawings, the first pressure sensor PS1 is provided at the front end of the inlet valve 291 of at least one of the first hydraulic circuit 201 and the second hydraulic circuit 202 to sense hydraulic pressure of the fluid applied to the first hydraulic circuit 201 and the second hydraulic circuit 202, and the second pressure sensor P2 senses hydraulic pressure of liquid in the first master chamber 23a. However, the present disclosure is not limited to these positions and numbers, and the pressure sensors may be provided in any of various numbers and at various positions as long as the hydraulic pressure of the hydraulic circuits 201 and 202 and the master cylinder 20 can be sensed.

Hereinafter, a method of operating the electronic brake system 1 according to the present embodiment will be described.

The operation of the electronic brake system 1 according to the present embodiment can be performed in a normal operation mode in which various devices and valves normally operate without a failure or abnormality, in an abnormal operation mode (fallback mode) in which a failure or abnormality occur in various devices or valves to operate abnormally, in an ABS dump mode in which hydraulic pressure of a wheel cylinder is rapidly and continuously reduced for an ABS operation, and in a diagnosis mode in which it is checked whether or not the master cylinder 20 leaks.

Figure 2:
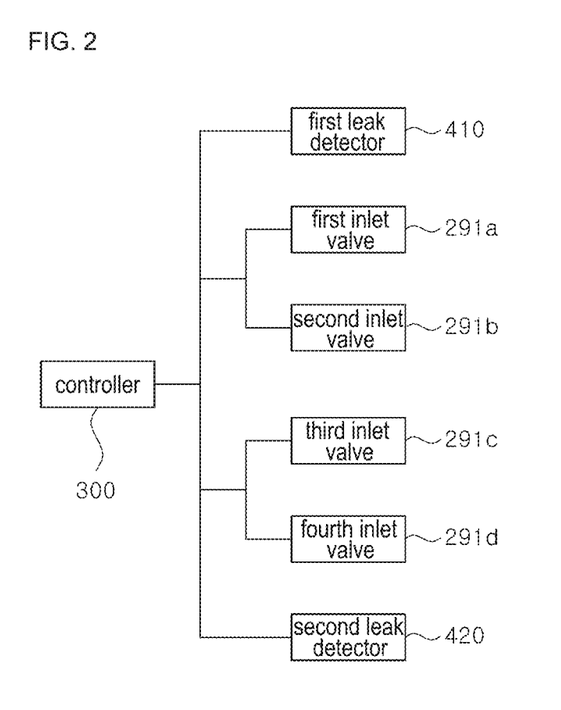
FIG. 2 is a block diagram illustrating an oil leak detecting system of a brake system according to an embodiment of the present disclosure.

Referring to FIG. 2, an oil leak detecting system of a brake system according to an embodiment of the present disclosure is described.

The brake system according to an embodiment of the present disclosure may check whether leak occurs in the brake system by using a controller 300 to close one of the first hydraulic circuit 201 and the second hydraulic circuit 202.

As described above, opening and closing of the first to fourth inlet valves 291a, 291b, 291c and 291d may be controlled by the controller 300. Here, the controller 300 may include an electronic control unit 310. For example, the first and second inlet valves 291a and 291b may operate to be closed in response to receiving a signal from the electronic control unit 310, and the third and fourth inlet valve 291c and 291d may operate to be closed in response to receiving a signal from the electronic control unit 310.

When the first and second inlet valves 1a and 291b are closed, the first hydraulic circuit 201 may be closed, and when the third and fourth inlet valves 291*c* and 291*d* are closed, the second hydraulic circuit 202 may be closed.

Then, the controller 300 may detect a leak of brake oil in the first hydraulic circuit 201 by using a first leak detector 410, and may detect a leak of brake oil in the second hydraulic circuit 202 by using a second leak detector 420.

The first leak detector 410 may detect an amount of leak of brake oil in the first hydraulic circuit 201 and transmit detected information to the controller 300, and the second leak detector 420 may detect an amount of leak of brake oil in the second hydraulic circuit 202 and transmit detected information to the controller 300.

Figure 3:
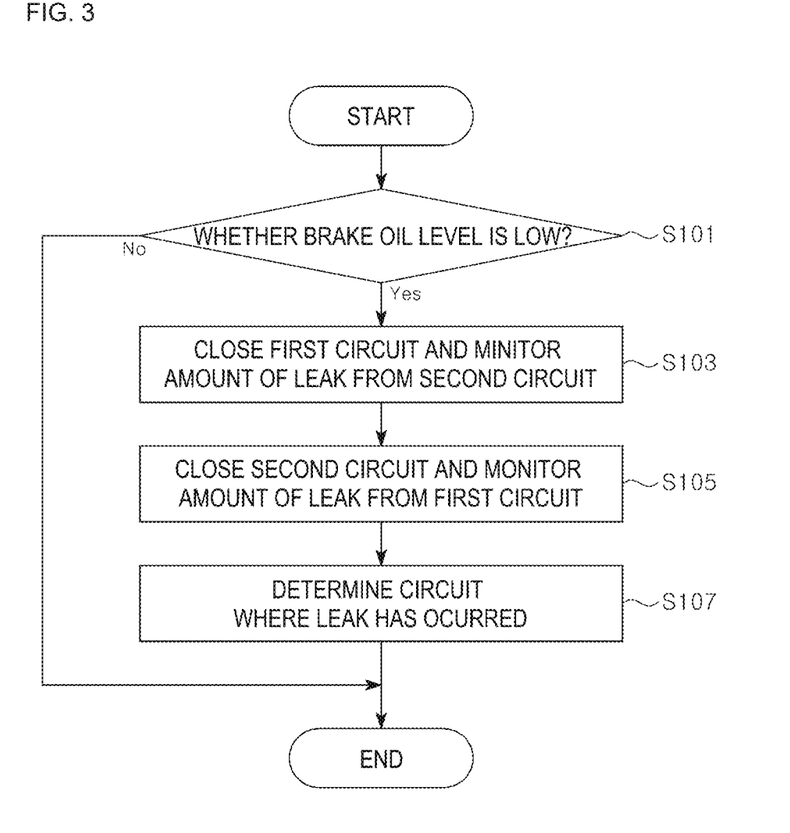
FIG. 3 is a flowchart for explaining an oil leak detecting method of a brake system according to an embodiment of the present disclosure.

Referring to FIG. 3, an oil leak detecting method of a brake system according to an embodiment will be described.

It is checked whether a level of brake oil is low (S101).

The controller 300 checks whether or not a level of brake oil is lower than a preset value. When the level is lower than the preset value, a level detector may be used to detect the level of brake oil.

When the level of brake oil is not low, a process of detecting a leak in the brake system is no longer performed.

The first hydraulic circuit 201 is closed and an amount of leak in the second hydraulic circuit 202 is monitored (S103).

When the level of the brake oil is lower than the preset value, the controller controls the first and second inlet valves 291*a* and 291*b* to close the first hydraulic circuit 201. Then, in order to check whether or not the brake oil leaks in the second hydraulic circuit 202, the amount of leak of brake oil in the second hydraulic circuit 202 is monitored using the second leak detector 420.

The second hydraulic circuit 202 is closed and an amount of leak in the first hydraulic circuit 201 is monitored (S105).

The controller 300 controls the third and fourth inlet valves 291*c* and 291*d* to close the second hydraulic circuit 202. Then, in order to check whether or not the brake oil leaks in the first hydraulic circuit 201, an amount of leak of brake oil in the second hydraulic circuit 202 is monitored through the first leak detector 410.

The leak is determined (S107).

The controller 300 determines where brake oil leaks from among the first hydraulic circuit 201 and the second hydraulic circuit 202. When the amount of leak of brake oil is detected in the second hydraulic circuit 202 in S103, it may be determined that the leak has occurred in the second hydraulic circuit 202, and when the amount of leak of brake oil is detected in the first hydraulic circuit 201 in S105, it may be determined that the leak has been occurred in the first hydraulic circuit 201.

In this manner, the controller 300 may close one of the first hydraulic circuit 201 and the second hydraulic circuit 202, and may detect occurrence of oil leak in the other hydraulic circuit by monitoring an amount of leak of brake oil.

Figure 4:
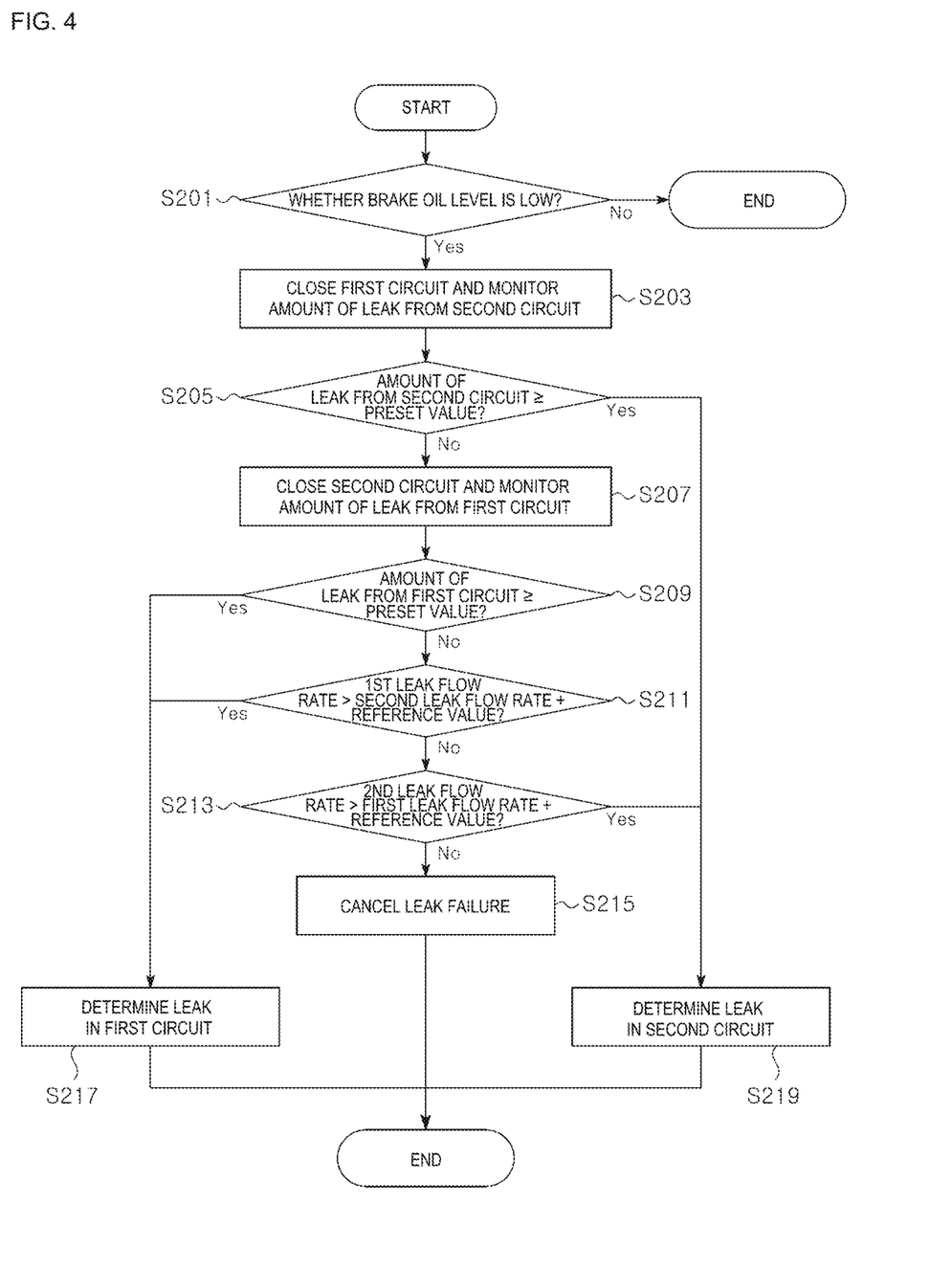
FIG. 4 is a detailed flowchart for explaining an oil leak detecting method of a brake system according to an embodiment of the present disclosure.

More specifically, with reference to FIG. 4, an oil leak detecting method of a brake system according to an embodiment of the present disclosure will be described.

It is checked whether a level of brake oil is low (S201).

The controller 300 checks whether or not the level of the brake oil is lower than a preset value. When the level of the brake oil is lower than the preset value, a level detector may be used to detect the level of brake oil. When the level of the brake oil is not lower than the preset value, a process of detecting leak of the brake system is no longer performed.

The first hydraulic circuit 201 is closed and an amount of leak in the second hydraulic circuit 202 is monitored (S203).

When the level of the brake oil is lower than the preset value, the controller controls to close the first and second inlet valves 291*a* and 291*b* so as to close the first hydraulic circuit 201. Then, in order to check whether or not the brake oil leaks in the second hydraulic circuit 202, the amount of leak of brake oil in the second hydraulic circuit 202 is monitored through the second leak detector 420.

It is determined whether the amount of leak in the second hydraulic circuit 202 is equal to or greater than the preset value (S205).

The controller 300 determines whether or not the amount of leak of brake oil in the second hydraulic circuit is greater than the preset value by using the second leak detector 420. At this point, it is determined whether the brake oil excessively leaks from the second hydraulic circuit 202 by using the second leak detector 420. In this step, when the amount of leak of brake oil from the first hydraulic circuit 201 is greater than the preset value, the process goes to S219 to determine whether or not brake oil leaks from the second hydraulic circuit 202.

The second hydraulic circuit 202 is closed and the amount of leak in the first hydraulic circuit 201 is monitored (S207).

When it is determined the amount of leak of brake oil from the second hydraulic circuit 202 is not greater than the preset value by using the second leak detector 420, the controller 300 controls to close the third and fourth inlet valves 291*c* and 291*d* to close the second hydraulic circuit 202. Then, in order to check whether or not the brake oil leaks in the first hydraulic circuit 201, the amount of leak of brake oil from the second hydraulic circuit 202 is monitored by using the first leak detector 410.

It is determined whether the amount of leak in the first hydraulic circuit 201 is equal to or greater than the preset value (S209).

The controller 300 determines whether or not the amount of leak of brake oil in the first hydraulic circuit 201 is greater than the preset value by using the first leak detector 410. At this point, it is determined whether the brake oil excessively leaks from the second hydraulic circuit 202 by using the first leak detector 410. In this step, when the amount of leak of brake oil from the first hydraulic circuit 201 is greater than the preset value, the process goes to S217, and it can be determined that the brake oil leaks in the first hydraulic circuit 201.

A leak flow rate of the first hydraulic circuit 201 and a leak flow rate of the second hydraulic circuit 202 are compared (S211).

The controller 300 compares a leak flow rate of brake oil from the first hydraulic circuit 201 and a leak flow rate of brake oil from the second hydraulic circuit 202. The leak flow rate of brake oil in the first hydraulic circuit 201 may be calculated by the controller 300 based on the amount of leak of brake oil from the first hydraulic circuit 201, which is detected by using the first leak detector 410. In addition, the leak flow rate of brake oil from the second hydraulic circuit 202 may be calculated by the controller 300 based on the amount of leak of brake oil from the second hydraulic circuit 202, which is detected by using the second leak detector 420.

In this step, the controller determines whether or not the leak flow rate of the first hydraulic circuit 201 is greater than a value obtained by adding the leak flow rate of the second hydraulic circuit 202 and a reference value. When the leak flow rate of the first hydraulic circuit 201 is greater than the value obtained by adding the leak flow rate of the second hydraulic circuit 202 and the reference value, the process goes to S217, and it may be determined that the brake oil leaks in the first hydraulic circuit 201.

The leak flow rate of the first hydraulic circuit 201 and the leak flow rate of the second hydraulic circuit 202 are compared (S213).

When the leak flow rate of the first hydraulic circuit 201 is not greater than the value obtained by adding the leak flow rate of the second hydraulic circuit 202 and the reference value, the controller 300 compares the leak flow rate of brake oil from the first hydraulic circuit 21 and the leak flow rate of break oil from the second hydraulic circuit 202. In this step, the controller 300 determines whether or not the leak flow rate of the second hydraulic circuit 202 is greater than a value obtained by adding the leak flow rate of the first hydraulic circuit 201 and a reference value. When the leak flow rate of the second hydraulic circuit 202 is greater than the value obtained by adding the leak flow rate of the first hydraulic circuit 201 and the reference value, the process goes to S219 and it may be determined that the brake oil leaks in the second hydraulic circuit 202.

A leak failure is canceled (S215).

In 213, when the leak flow rate of the second hydraulic circuit 202 is not greater than the value obtained by adding the leak flow rate of the first hydraulic circuit 201 and the reference value, the controller 300 determines that no leak has occurred in the first and second hydraulic circuits 201 and 202, and cancels the leak failure.

A leak in the first hydraulic circuit 201 is determined (S127).

When the amount of leak in the first oil circuit 201, which is detected by using the first leak detector 410, is greater than the reference value in S209 and when the leak flow rate of the first hydraulic circuit 201 is greater than the value obtained by adding the leak flow rate of the second hydraulic circuit 202 and the reference value in S211, it is determined that brake oil leaking in the first hydraulic circuit 201.

A leak in the second hydraulic circuit 202 is determined (S129).

When the amount of leak in the second oil circuit 202, which is detected by using the second leak detector 420, is greater than the reference value in S205 and when the leak flow rate of the second hydraulic circuit 202 is greater than the value obtained by adding the leak flow rate of the first hydraulic circuit 201 and the reference value in S213, it is determined that brake oil leaking in the second hydraulic circuit 202.

One embodiment of the present disclosure has an effect of detecting a minute leak of brake oil.

Moreover, there is an effect of specifying where brake oil leaks from among a first circuit and a second circuit.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An oil leak detecting method comprising:
   closing a first hydraulic circuit and monitoring an amount of a leak of brake oil in a second hydraulic circuit;
   closing the second hydraulic circuit and monitoring an amount of a leak of brake oil in the first hydraulic circuit;
   comparing a leak flow rate of brake oil from the first hydraulic circuit with a leak flow rate of brake oil from the second hydraulic circuit when each of the amount of leak of brake oil in the first hydraulic circuit and the amount of leak of brake oil in the second hydraulic circuit is not greater than a preset value; and
   determining where brake oil leaks from among the first hydraulic circuit and the second hydraulic circuit based on a comparison result of the leak flow rates,
   wherein the first hydraulic circuit controls a flow of hydraulic pressure transmitted to two wheel cylinders, and
   wherein the second hydraulic circuit controls a flow of hydraulic pressure transmitted to other two wheel cylinders.

2. The oil leak detecting method of claim 1, further comprising checking a level of brake oil,
   wherein the monitoring of the amount of leak of brake oil in the second hydraulic circuit comprises monitoring the amount of leak of brake oil in the second hydraulic circuit based on a level of the brake oil being lower than a preset value.

3. The oil leak detecting method of claim 1, wherein the determining where brake oil leaks from among the first hydraulic circuit and the second hydraulic circuit comprises determining that a leak has occurred in the second hydraulic circuit based on an amount of leak of brake oil in the second hydraulic circuit being greater than the preset value.

4. The oil leak detecting method of claim 1, wherein the determining where brake oil leaks from among the first hydraulic circuit and the second hydraulic circuit comprises determining that a leak has occurred in the first hydraulic circuit based on an amount of leak of brake oil in the first hydraulic circuit being greater than the preset value.

5. The oil leak detecting method of claim 1, wherein the determining where brake oil leaks from among the first hydraulic circuit and the second hydraulic circuit comprises determining that leak has occurred in the first hydraulic circuit based on a leak flow rate of brake oil from the first hydraulic circuit being greater than a value obtained by adding a reference value to the leak flow rate of brake oil from the second hydraulic circuit.

6. The oil leak detecting method of claim 1, wherein the determining where brake oil leaks from among the first hydraulic circuit and the second hydraulic circuit comprises determining that a leak has occurred in the second hydraulic circuit based on a leak flow rate of brake oil from the second hydraulic circuit being greater than a value obtained by adding a reference value to the leak flow rate of brake oil flowing out of the first hydraulic circuit.

7. The oil leak detecting method according to claim 1, wherein the determining where brake oil leaks from among the first hydraulic circuit and the second hydraulic circuit comprises determining that no leak has occurred in the first hydraulic circuit and the second hydraulic circuit based on a leak flow rate of brake oil from the second fluid circuit being not greater than the value obtained by adding the reference value to the leak flow rate of the braking oil from the first fluid circuit.

8. A leak detecting system comprising:
a first hydraulic circuit configured to control a flow of hydraulic pressure transmitted to two wheel cylinders;
a second hydraulic circuit configured to control a flow of hydraulic pressure transmitted to other two wheel cylinders;
first and second inlet valves for opening and closing the first hydraulic circuit;
third and fourth inlet valves for opening and closing the second hydraulic circuit; and
a controller configured to control the first, second, third and fourth inlet valves, wherein the controller is further configured to:
close of the first hydraulic circuit and monitor an amount of leak of brake oil in the second hydraulic circuit,
close the second hydraulic circuit, and monitor an amount of leak of brake oil in the first hydraulic circuit,
compare a leak flow rate of brake oil from the first hydraulic circuit with a leak flow rate of brake oil from the second hydraulic circuit when each of the amount of leak of brake oil in the first hydraulic circuit and the amount of leak of brake oil in the second hydraulic circuit is not greater than a preset value, and
determine where brake oil leaks from among the first hydraulic circuit and the second hydraulic circuit based on a comparison result of the leak flow rates.

9. The oil leak detecting system of claim 8, further comprising:
a first leak detector configured to detect an amount of leak of brake oil in the first hydraulic circuit; and
a second leak detector configured to detect an amount of leak of brake oil in the second hydraulic circuit.

10. The oil leak detecting system of claim 8, wherein the controller is further configured to:
determine that a leak has occurred in the second hydraulic circuit based on an amount of leak of brake oil from the second hydraulic circuit being greater than a preset value.

11. The oil leak detecting system of claim 8, wherein the controller is further configured to:
determine that brake oil leaks in the first hydraulic circuit based on an amount of leak of brake oil from the first hydraulic circuit being greater than a preset value.

12. The oil leak detecting system of claim 8, wherein the control unit is configured to determine that a leak of brake oil has occurred in the first hydraulic circuit based on a leak flow rate of brake oil from the second hydraulic circuit being greater than a value obtained by adding a reference value to the leak flow rate of the braking oil from the second hydraulic circuit.

13. The oil leak detecting system of claim 8, wherein the controller is configured to determine that brake oil leaks in the second hydraulic circuit based on a leak flow rate of brake oil from the first hydraulic circuit being greater than a value obtained by adding a reference value to the leak flow rate of brake oil from the second hydraulic circuit.

14. The oil leak detecting system of claim 8, wherein the controller is configured to determine that no leak has occurred in the first hydraulic circuit and the second hydraulic circuit based on a leak flow rate of brake oil from the first hydraulic circuit being not greater than a value obtained by adding a reference value to the leak flow rate of the braking oil from the second oil hydraulic circuit.

15. The oil leak detecting system of claim 14, wherein the controller is configured to determine that no leak has occurred in the first hydraulic circuit and the second hydraulic circuit based on a leak flow rate of brake oil from the second hydraulic circuit being not greater than a value obtained by adding a reference value to a leak flow rate of brake oil from the first fluid hydraulic circuit.

* * * * *